United States Patent
Kim et al.

(10) Patent No.: US 8,259,278 B2
(45) Date of Patent: Sep. 4, 2012

(54) LIQUID CRYSTAL DISPLAY

(75) Inventors: Sung-Woon Kim, Suwon-si (KR);
Hwa-Sung Woo, Suwon-si (KP);
Joo-Nyung Jang, Gyeongsan-si (KR);
Mi-Jeong Song, Suwon-si (KR);
Hwang-Yul Kim, Hwaseong-si (KR);
Cheol Shin, Hwaseong-si (KR);
Dong-Chul Shin, Seoul (KR); Hee-Seop Kim, Hwaseong-si (KR); Jung-Hyeon Kim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 427 days.

(21) Appl. No.: 12/508,031

(22) Filed: Jul. 23, 2009

(65) Prior Publication Data

US 2010/0134707 A1    Jun. 3, 2010

(30) Foreign Application Priority Data

Nov. 28, 2008    (KR) ........................ 10-2008-0120017

(51) Int. Cl.
*G02F 1/1339* (2006.01)
*G02F 1/1337* (2006.01)
*G02F 1/1343* (2006.01)
(52) U.S. Cl. .................... 349/156; 349/130; 349/141
(58) Field of Classification Search .......... 349/129–130, 349/139, 141, 155–156
See application file for complete search history.

(56) References Cited

U.S. PATENT DOCUMENTS

| | | | | |
|---|---|---|---|---|
| 7,538,850 | B2* | 5/2009 | Kim et al. | 349/155 |
| 7,898,625 | B2* | 3/2011 | Hayashi et al. | 349/130 |
| 2003/0001998 | A1* | 1/2003 | Kun | 349/129 |
| 2005/0078263 | A1* | 4/2005 | Kim et al. | 349/144 |
| 2008/0003380 | A1 | 1/2008 | Kim et al. | |

FOREIGN PATENT DOCUMENTS

| | | |
|---|---|---|
| JP | 10268357 | 10/1998 |
| JP | 2003329997 | 11/2003 |
| JP | 2006119539 | 5/2006 |
| JP | 2007052368 | 3/2007 |
| JP | 2007219494 | 8/2007 |
| JP | 2008197183 | 8/2008 |
| KR | 1020040013961 | 2/2004 |
| KR | 1020050087460 | 8/2005 |
| KR | 100672651 | 1/2007 |
| KR | 1020070067961 | 6/2007 |
| KR | 1020080073866 | 8/2008 |

* cited by examiner

*Primary Examiner* — Dung T. Nguyen
(74) *Attorney, Agent, or Firm* — Cantor Colburn LLP

(57) ABSTRACT

A liquid crystal display includes; first and second substrates facing each other, a liquid crystal layer interposed between the first and second substrates and including liquid crystal molecules, a first subpixel electrode disposed on the first substrate, the first subpixel electrode receiving a first data voltage, a second subpixel electrode disposed on the first substrate, the second subpixel electrode receiving a second data voltage; and a short protrusion disposed on the second substrate and simultaneously facing the first and second subpixel electrodes, wherein the liquid crystal layer is vertically aligned and has positive dielectric anisotropy.

13 Claims, 13 Drawing Sheets

LIQUID CRYSTAL DISPLAY

This application claims priority to Korean Patent Application No. 10-2008-0120017, filed on Nov. 28, 2008, and all the benefits accruing therefrom under 35 U.S.C. §119, the contents of which in its entirety are herein incorporated by reference.

BACKGROUND OF THE INVENTION (a) Field of the Invention

The present invention relates to a liquid crystal display ("LCD").

(b) Description of the Related Art

A liquid crystal display (hereinafter referred to as an "LCD") is one of the most widely used flat panel displays. A typical LCD includes two display panels provided with electric field generating electrodes, such as pixel electrodes and a common electrode, and a liquid crystal layer interposed between the two display panels. In the typical LCD, voltages are applied to the electric field generating electrodes to generate an electric field in the liquid crystal layer. Due to the generated electric field, alignment of the liquid crystal molecules may be controlled to effect polarization of incident light passing therethrough, thereby displaying images.

The typical LCD also includes switching elements connected to the respective pixel electrodes, and a plurality of signal lines such as gate lines and data lines for controlling the switching elements and applying voltages to the pixel electrodes.

The typical LCD receives an input image signal from an external graphics controller, the input image signal contains luminance information for each pixel PX, and the luminance has a particular number of possible grays (e.g., a preset grayscale). Each pixel is applied with a data voltage corresponding to the desired luminance information. The data voltage applied to the pixel appears as a pixel voltage according to a difference with reference to the common voltage, and each pixel displays the luminance representing a gray of the image signal according to the pixel voltage. Here, the range of the pixel voltages that are applicable to the LCD is determined according to a driver.

On the other hand, the driver of the LCD is typically mounted on the display panel in a form of a plurality of IC chips, or is installed on a flexible circuit film and attached to the display panel. However, the IC chip makes up a high proportion of the manufacturing cost of an LCD.

Also, the aperture ratio of a display device is remarkably reduced as the number of wires formed in the liquid crystal panel assembly, such as the gate lines or data lines, increases.

BRIEF SUMMARY OF THE INVENTION

An exemplary embodiment of a liquid crystal display ("LCD") according to an exemplary embodiment of the present invention includes; first and second substrates facing each other; a liquid crystal layer interposed between the first and second substrates and including liquid crystal molecules, a first subpixel electrode disposed on the first substrate, the first subpixel electrode receiving a first data voltage, a second subpixel electrode disposed on the first substrate, the second subpixel electrode receiving a second data voltage, and a short protrusion disposed on the second substrate and simultaneously facing the first and second subpixel electrodes, wherein the liquid crystal layer is vertically aligned and has positive dielectric anisotropy.

In one exemplary embodiment, the short protrusion may include a conductive polymer.

In one exemplary embodiment, the liquid crystal display may further include a short electrode disposed on the short protrusion.

In one exemplary embodiment, the short electrode may include a conductive material, exemplary embodiments of which include indium tin oxide ("ITO") and indium zinc oxide ("IZO").

In one exemplary embodiment, a height of the short protrusion may be smaller than a cell gap of the liquid crystal layer.

In one exemplary embodiment, the short protrusion may be disposed in a region where light is not transmitted.

In one exemplary embodiment, the liquid crystal display may further include a light blocking member disposed on at least one of the first substrate and the second substrate, wherein the short protrusion may overlap the light blocking member.

In one exemplary embodiment, the liquid crystal display may further include; a gate line disposed on the first substrate and which transmits a gate signal, a first data line disposed on the first substrate, the first data line transmitting the first data voltage, a second data line disposed on the first substrate, the second data line transmitting the second data voltage, a first switching element connected to the gate line and the first data line and including a first drain electrode connected to the first subpixel electrode, and a second switching element connected to the gate line and the second data line and including a second drain electrode connected to the second subpixel electrode.

In one exemplary embodiment, the short protrusion may overlap at least one of the first and second drain electrodes.

In one exemplary embodiment, the liquid crystal display may further include a storage electrode line disposed on the first substrate and comprising a portion overlapping at least one of the first and second drain electrodes, wherein the short protrusion may overlap the storage electrode line.

In one exemplary embodiment, each of the first and second subpixel electrodes may include a plurality of branch electrodes, wherein the branch electrodes of the first subpixel electrode and the branch electrodes of the second subpixel electrode may be alternately disposed.

In one exemplary embodiment, the first and second data voltages may have different polarities and a same magnitude with respect to a common voltage.

In one exemplary embodiment, a common electrode which is disposed on the short protrusion and applied with a common voltage.

Another exemplary embodiment of an LCD according to the present invention includes; first and second substrates facing each other, a liquid crystal layer interposed between the first and second substrates and including liquid crystal molecules, a pixel electrode disposed on the first substrate and including a first inclination direction determining member, a short protrusion disposed on the second substrate and facing the pixel electrode, and a common electrode disposed on the short protrusion, the common electrode including a second inclination direction determining member, the common electrode receiving a common voltage, wherein the liquid crystal layer is vertically aligned and has negative dielectric anisotropy.

In one exemplary embodiment, at least one of the first and second inclination direction determining members may include a cutout.

BRIEF DESCRIPTION OF THE DRAWINGS

The above and other aspects, advantages, and features of the invention will become more apparent by describing in further detail exemplary embodiments thereof with reference to the attached drawings, in which.

DETAILED DESCRIPTION OF THE INVENTION

Figure 1:
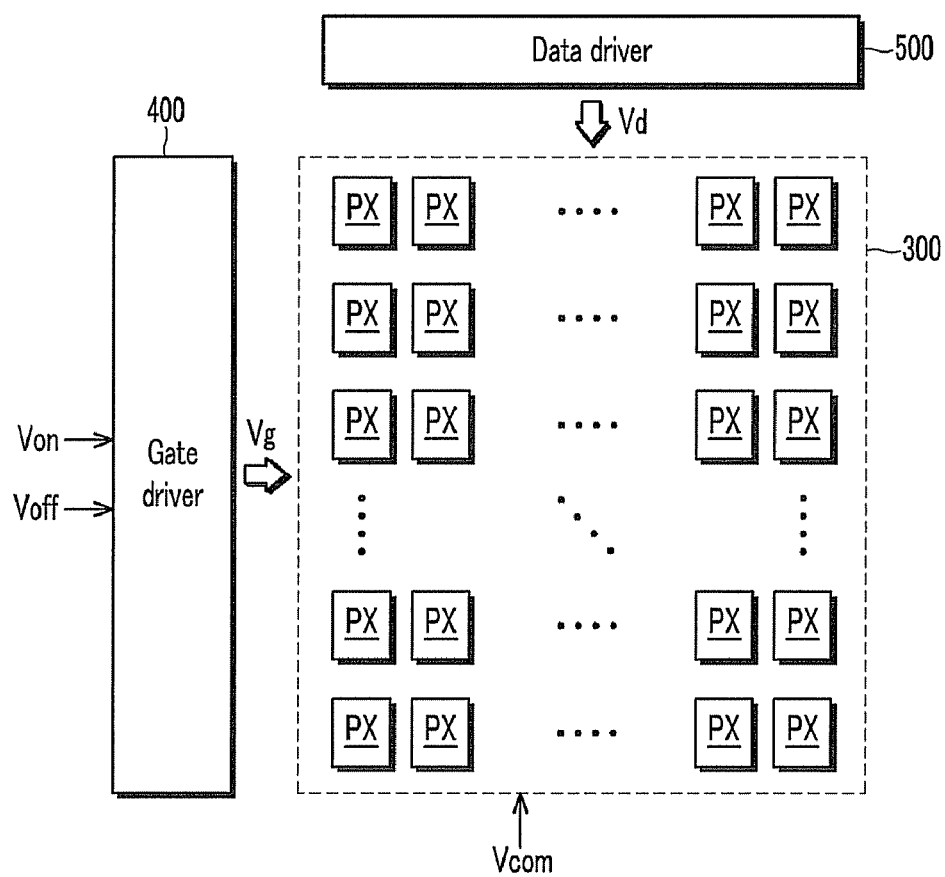
FIG. 1 is a block diagram of an exemplary embodiment of a liquid crystal display ("LCD") according to the present invention.

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Now, a liquid crystal display ("LCD") according to an exemplary embodiment of the present invention will be described with reference to FIG. 1 to FIG. 3.

Figure 2:
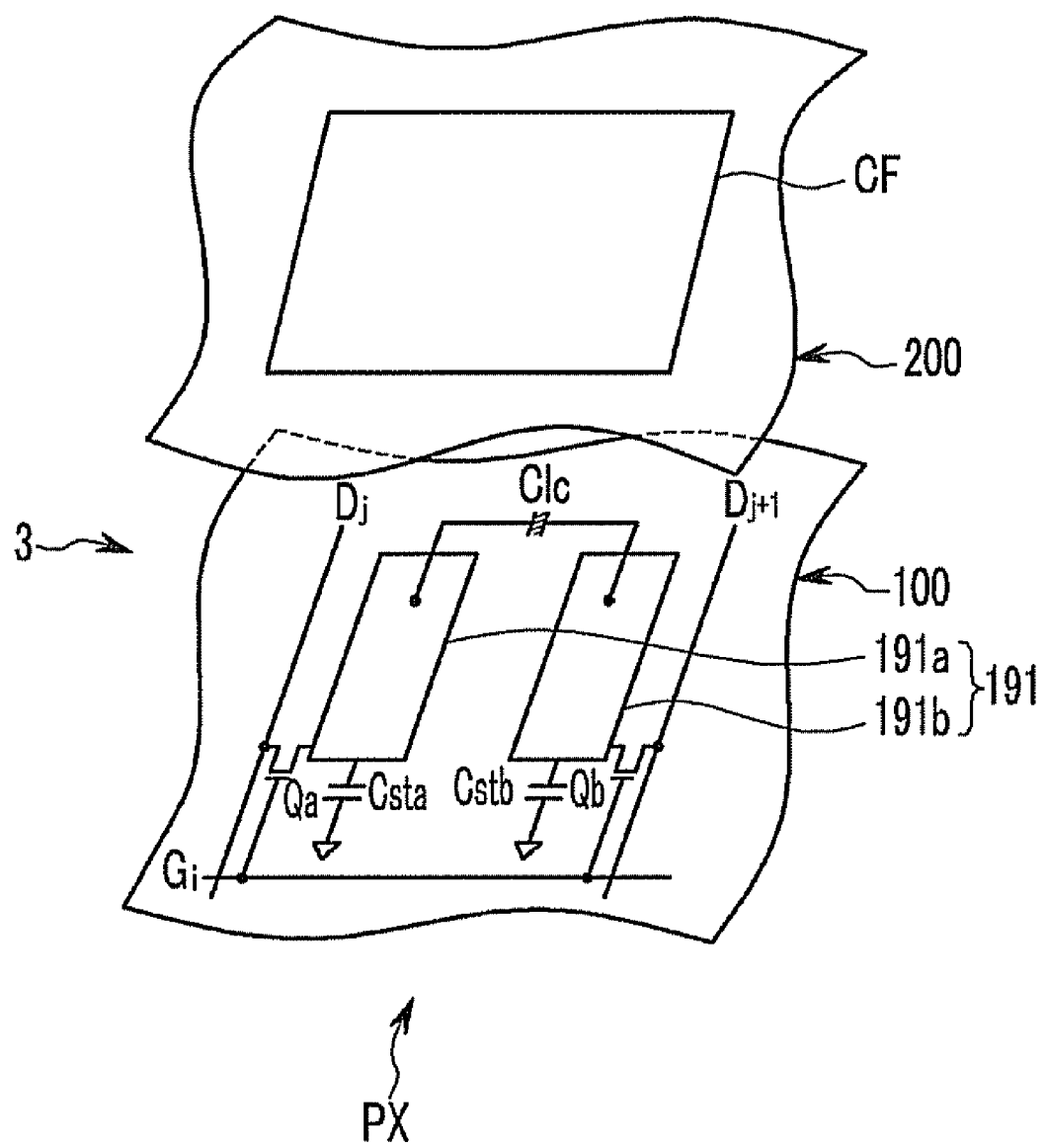
FIG. 2 is an equivalent circuit diagram of one pixel of an exemplary embodiment of an LCD having an exemplary embodiment of a structure according to the present invention.
Figure 3:
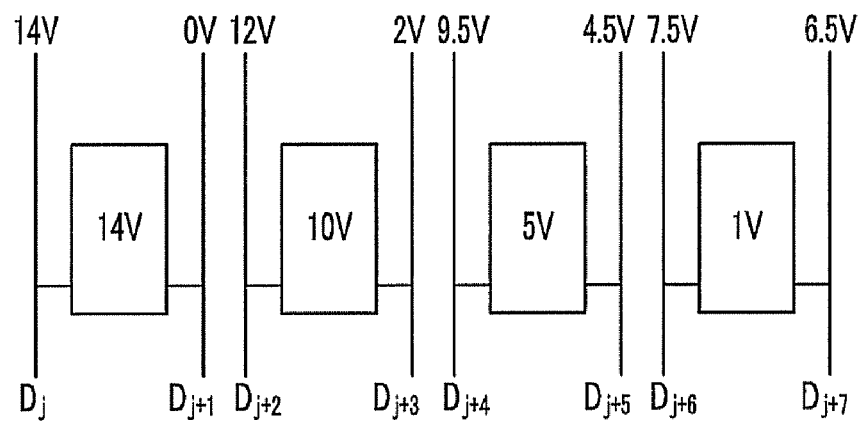
FIG. 3 is a schematic diagram illustrating a pixel and a voltage applied to a data line of an exemplary embodiment of an LCD according to the present invention.

FIG. 1 is a block diagram of an exemplary embodiment of an LCD according to the present invention, FIG. 2 is an equivalent circuit diagram of one pixel of an exemplary embodiment of an LCD having an exemplary embodiment of a structure according to the present invention, and FIG. 3 is a schematic diagram illustrating a pixel and a voltage applied to a data line of an exemplary embodiment of an LCD according to the present invention.

As shown in FIG. 1, an exemplary embodiment of an LCD according to the present invention includes a liquid crystal panel assembly 300, a gate driver 400, and a data driver 500.

Referring to FIG. 1 and FIG. 2, in an equivalent circuit, the liquid crystal panel assembly 300 includes a plurality of signal lines Gi, Dj, and D(j+1), and a plurality of pixels PX that are connected to the plurality of signal lines and are arranged in an approximately matrix shape. Meanwhile, the liquid crystal panel assembly 300 includes lower and upper panels 100 and 200 that face each other, and a liquid crystal layer 3 interposed therebetween.

The signal lines $G_i$, $D_j$, and $D_{j+1}$ include a plurality of gate lines G1-Gn that transmit gate signals (also referred to as "scanning signals"), and a plurality of data lines D1-Dm that transmit data signals. The gate lines $G_i$ extend substantially in a transverse direction and are disposed substantially parallel to each other, and the data lines $D_j$ and $D_{j+1}$ extend substantially in a longitudinal direction and are disposed substantially parallel to each other.

Referring to FIG. 2, each pixel PX includes first and second switching elements Qa and Qb, respectively, connected to signal lines $G_i$, $D_j$, and $D_{j+1}$, a liquid crystal capacitor Clc, and first and second storage capacitors Csta and Cstb connected thereto. Alternative exemplary embodiments include configurations wherein the first and second storage capacitors Csta and Cstb are omitted.

In the present exemplary embodiment, the first/second switching element Qa/Qb is a three-terminal element such as a thin film transistor ("TFT") provided on the lower panel 100, having a control terminal connected to the gate line Gi, an input terminal connected to the data line Dj/D(j+1), and an output terminal connected to the liquid crystal capacitor Clc and the first/second storage capacitor Csta/Cstb.

The liquid crystal capacitor Clc uses a first subpixel electrode 191a and a second subpixel electrode 191b of the lower panel 100 as two terminals thereof. The first and second subpixel electrodes 191a and 191b form a pixel electrode 191. The liquid crystal layer 3 between the first and second subpixel electrodes 191a and 191b functions as a dielectric material of the liquid crystal capacitor Clc.

Exemplary embodiments include configurations wherein the pixel electrode 191, including the first and second subpixel electrodes 191a and 191b, formed on the lower panel 100, and the common electrode, may be disposed in a different layer from each other or in the same layer, e.g., they may be formed together on the upper or lower panels 200 or 100, respectively. When the pixel electrode 191 and the common electrode CE are disposed on the same panel 100 or 200, the display device is said to exhibit in-plane switching. The first and second subpixel electrodes 191a and 191b are respectively connected to the first and second switching elements Qa and Qb, respectively. In an alternative exemplary embodiment, the second subpixel electrode 191b may be provided in the upper panel 200, wherein the second subpixel electrode 191b may not be connected to a switching element but applied with a common voltage Vcom.

In the present exemplary embodiment, the liquid crystal layer 3 has dielectric anisotropy, and liquid crystal molecules of the liquid crystal layer 3 may be aligned such that their major axes are substantially perpendicular to the surfaces of the two display panels when no electric field is applied. That is, the liquid crystal layer 3 may be vertically aligned.

In one exemplary embodiment, the first/second storage capacitor Csta/Cstb, which serve as assistants to the liquid crystal capacitor Clc, may be formed where an additional electrode line (not shown) provided on the lower display panel 100 overlaps the first/second subpixel electrode 191a/191b with an insulator interposed therebetween.

For color display, each pixel PX uniquely represents one of primary colors (i.e., spatial division) or each pixel PX sequentially represents the primary colors in turn (i.e., temporal division), such that a spatial or temporal sum of the primary colors is recognized by a user as a desired color. An exemplary embodiment of a set of the primary colors includes red, green, and blue colors. FIG. 2 shows an example of the spatial division in which each pixel PX includes a color filter CF representing one of the primary colors in an area of the upper panel 200 facing the first and second subpixel electrodes 191a and 191b. Alternative exemplary embodiments include configurations wherein the color filter CF may be provided on or under the first and second subpixel electrodes 191a and 191b on the lower panel 100.

At least one polarizer (not shown) for providing light polarization is provided in the liquid crystal panel assembly 300.

Referring again to FIG. 1, the gate driver 400 is connected to the gate lines $G_i$ of the liquid crystal panel assembly 300, and applies gate signals Vg, each of which is a combination of a gate-on voltage Von and a gate-off voltage Voff, to the gate lines $G_i$.

The data driver 500 is connected to the data lines $D_j$ and $D_{j+1}$ of the liquid crystal panel assembly 300 to apply data voltages Vd to the data lines $D_j$ and $D_{j+1}$.

Next, an exemplary embodiment of a driving method of an LCD according to the present invention will be described with reference to FIG. 3 and FIG. 4 as well as FIG. 1 and FIG. 2.

Figure 4:
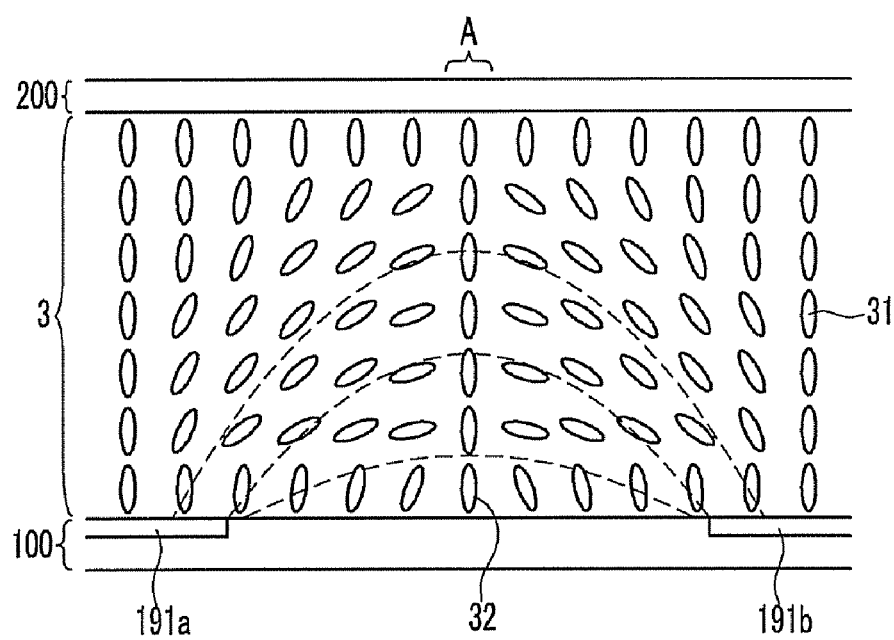
FIG. 4 is a cross-sectional view of an exemplary embodiment of an LCD of the present invention.

FIG. 3 is a schematic diagram illustrating a pixel and a voltage applied to a data line of an exemplary embodiment of an LCD according to the present invention, and FIG. 4 is a cross-sectional view of an exemplary embodiment LCD according to the present invention.

First, referring to FIG. 1 and FIG. 2, the data driver 500 applies data voltages Vd for a row of pixels to the corresponding data lines $D_j$ and $D_{j+1}$. The gate driver 400 applies the gate-on voltage Von to the gate lines $G_i$, so as to turn on the first and second switching elements Qa and Qb connected thereto. Accordingly, the data voltages applied to the data lines $D_j$ and $D_{j+1}$ are supplied to the pixels PX through the turned-on first and second switching elements Qa and Qb. That is, the first subpixel electrode 191a is applied with the data voltage Vd of the first data line $D_j$ through the first switching element Qa, and the second subpixel electrode 191b is applied with the data voltage Vd of the second data line $D_{j+1}$ through the second switching element Qb. The data voltages applied to the first and second subpixel electrodes 191a and 191b are voltages corresponding to the luminance to be displayed by the pixel PX, and, in the present exemplary embodiment, have opposite polarities to each other with respect to the common voltage Vcom.

The difference between two data voltages Vd applied to the first and second subpixel electrodes 191a and 191b and having the opposite polarity appears as a charged voltage of the liquid crystal capacitor Clc, that is, a pixel voltage. This will be described in more detail with reference to FIG. 3.

FIG. 3 illustrates a data voltage Vd applied to the data lines $D_j$, $D_{j+1}$, $D_{j+2}$, $D_{j+3}$, $D_{j+4}$, $D_{j+5}$, $D_{j+6}$, and $D_{j+7}$ in the exemplary embodiment wherein the charged voltages of the liquid crystal capacitors Clc of the four neighboring pixels PX, that is, the pixel voltages, are 14V, 10V, 5V, and 1V, respectively, and the maximum and minimum voltages that are available in the liquid crystal display are respectively 0V and 14V according to an exemplary embodiment of the present invention.

Referring to FIG. 3, each pixel PX is connected to two data lines, e.g., $D_j$ and $D_{j+1}/D_{j+2}$ and $D_{j+3}/D_{j+4}$ and $D_{j+5}/D_{j+6}$ and $D_{j+7}$. In the present exemplary embodiment, the two data lines $D_j$ and $D_{j+1}/D_{j+2}$ and $D_{j+3}/D_{j+4}$ and $D_{j+5}/D_{j+6}$ and $D_{j+7}$ connected to one pixel PX are applied with different data voltages Vd having different polarities with respect to the common voltage Vcom. The difference between the two data voltages Vd is the pixel voltage of each pixel PX. For example, in the exemplary embodiment wherein the common voltage Vcom is 7V, the target pixel voltage of the first pixel PX is 14V such that the first and second data lines $D_j$ and $D_{j+1}$ may be applied with 14V and 0V, and the target pixel voltage of the second pixel PX is 10V such that the third and fourth data lines $D_{j+2}$ and $D_{j+3}$ may be applied with 12V and 2V. Also, the target pixel voltage of the third pixel PX is 5V such that the fifth and sixth data lines $D_{j+4}$ and $D_{j+5}$ may be applied with 9.5V and 4.5V, and the target pixel voltage of the fourth pixel PX is 1V such that the seventh and eighth data lines $D_{j+6}$ and $D_{j+7}$ may be applied with 7.5V and 6.5V. These target pixel voltages and data voltages are included herein to better illustrate the invention and are not limiting thereof.

In this way, if a potential difference is generated between both terminals of the liquid crystal capacitors Clc, an electric field that is substantially parallel to the surface of the display panels 100 and 200 is generated in the liquid crystal layer 3 between the first and second subpixel electrodes 191a and 191b. When liquid crystal molecules 31 have positive dielectric anisotropy, the liquid crystal molecules 31 of the liquid crystal layer 3 are arranged in response to the electric field such their long axes may be inclined substantially parallel to the direction of the electric field, and the inclination degree depends on a magnitude of the pixel voltage. Such a liquid crystal layer 3 is called an EOC (electrically-induced optical compensation) mode layer. Also, the change degree of the polarization of light that passes through the liquid crystal layer 3 is changed according to the declination degree of the liquid crystal molecules 31. Such change of the polarization appears as a change of transmittance by the polarizer, and thereby the pixels PX display images having the desired luminance, e.g., grayscale.

By repeating this procedure by a unit of a horizontal period (also referred to as "1H"), the gate-on voltage Von is sequentially applied to all gate lines $G_i$ and the data voltage Vd is applied to all pixels PX, thereby displaying images for a frame.

In one exemplary embodiment, when the next frame starts after one frame finishes, the inversion control signal RVS applied to the data driver 500 is controlled such that the polarity of the data signals is reversed (which is referred to as "frame inversion"). In such an exemplary embodiment, the polarity of the data voltages Vd flowing in the data lines $D_j$ and $D_{j+1}$ is periodically reversed during one frame according to the characteristic of the inversion signal (for example row inversion and dot inversion), or the polarity of the data voltages Vd applied to the row of one pixels may be reversed (for example column inversion and dot inversion).

In this way, two data voltages Vd having different polarities with respect to the common voltage Vcom are applied to one pixel PX such that a driving voltage of an LCD may be increased, a response speed of liquid crystal molecules 31 may be improved, and transmittance of an LCD may be improved. Also, since polarities of two data voltages Vd applied to one pixel PX are substantially opposite to each other with respect to a common voltage, even in a case that the inversion type at the data driver 500 is column inversion or row inversion, degradation of display quality due to flicker may be prevented, similar to dot inversion driving.

Moreover, since when the first and second switching elements Qa and Qb in one pixel PX are turned off, the voltages applied to the first and second subpixel electrodes 191a and 191b all drop by the respective kickback voltages such that the charged voltage of the pixel PX is hardly changed. Accordingly, display characteristics of an LCD may be improved.

Also, when liquid crystal molecules 31 that are arranged substantially perpendicular to the display panels 100 and 200 in the initial state are used, the contrast ratio of an LCD may be increased and a wide viewing angle may be realized. Particularly, liquid crystal molecules 31 having positive dielectric anisotropy have larger dielectric anisotropy and lower rotational viscosity compared to liquid crystal molecules having negative dielectric anisotropy, so a fast response speed may be obtained. Additionally, since inclination directions of liquid crystal molecules 31 having positive dielectric anisotropy are definitely determined in response to an electric field so that the liquid crystal molecules 31 are rearranged substantially instantaneously even when the arrangement of the liquid crystal molecule 31 is disordered, good display characteristics may be obtained.

Next, a detailed structure of an exemplary embodiment of an LCD according to the present invention will be described in detail with reference to FIG. 5 to FIG. 8 as well as FIG. 1 to FIG. 4.

Figure 5:
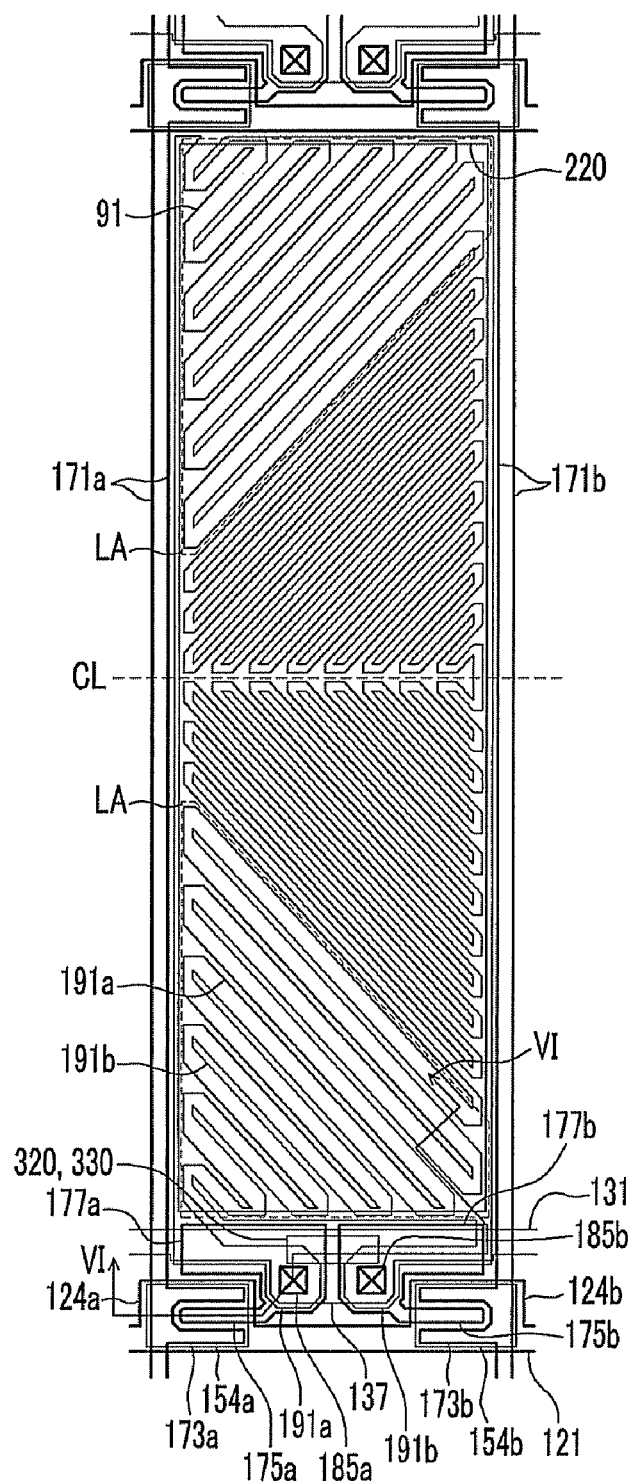
FIG. 5 is a top plan layout view of an exemplary embodiment of an LCD according to the present invention.
Figure 6:
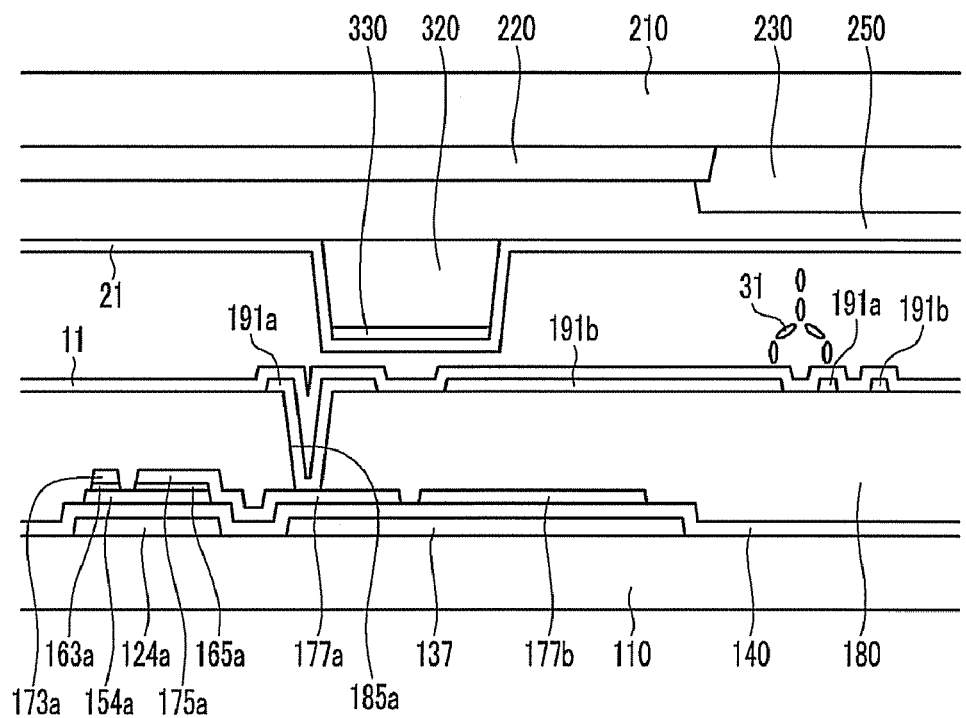
FIG. 6 and FIG. 7 are cross-sectional views illustrating first and second exemplary embodiments of the LCD shown in FIG. 5 taken along line VI-VI, respectively.
Figure 7:
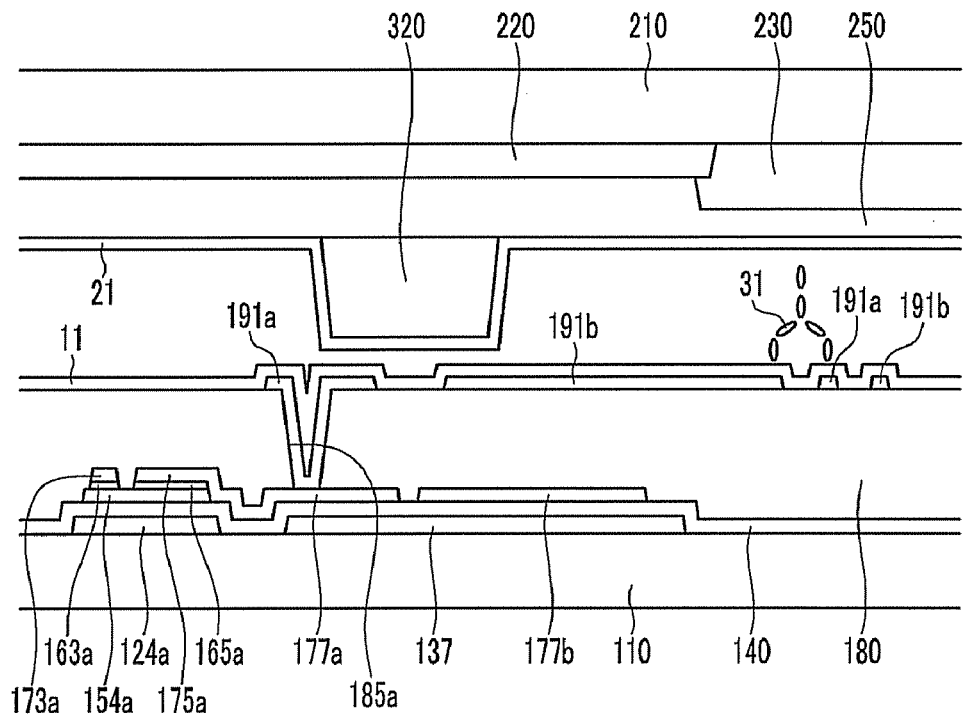
Figure 8:
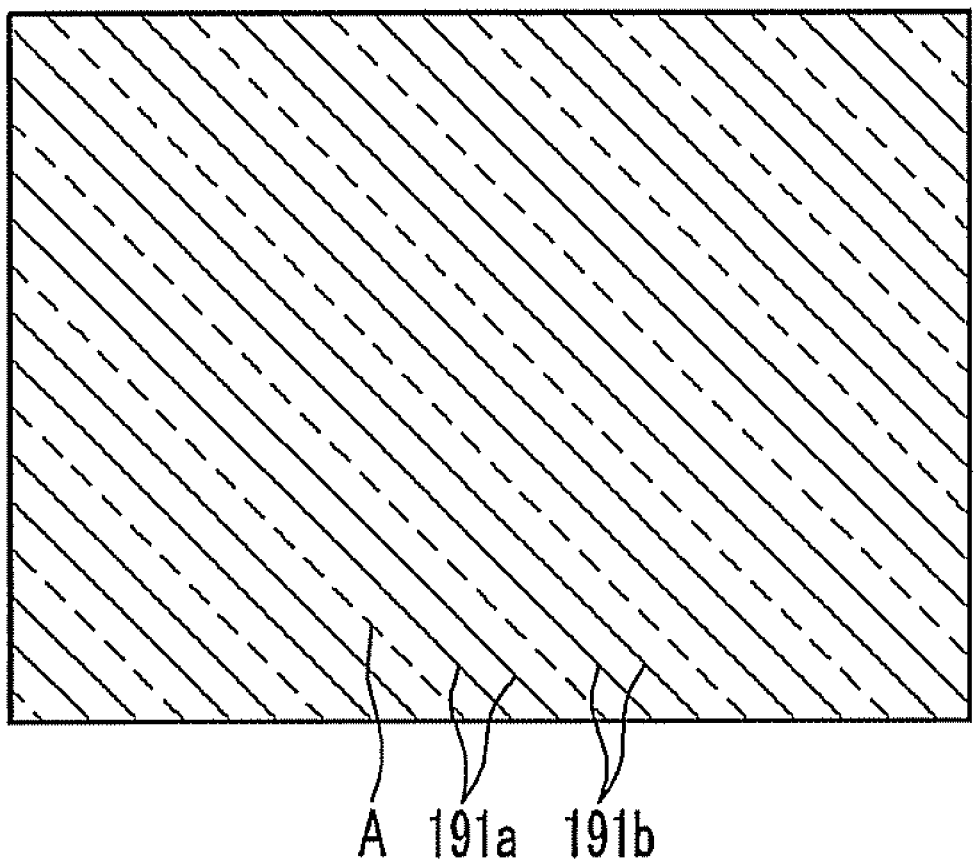
FIG. 8 is a view illustrating arrangement of pixel electrodes in an exemplary embodiment of an LCD according to the present invention.

FIG. 5 is a top plan layout view of an exemplary embodiment of an LCD according to the present invention, FIG. 6 and FIG. 7 are cross-sectional views of first and second exemplary embodiments of the exemplary embodiment of an LCD shown in FIG. 5 taken along line VI-VI, respectively, and FIG. 8 is a view illustrating arrangement of pixel electrodes in an exemplary embodiment of an LCD according to the present invention.

Referring to FIG. 5 to FIG. 7, an exemplary embodiment of an LCD according to the present invention includes a lower panel 100 and an upper panel 200 facing each other, and a liquid crystal layer 3 interposed between the display panels 100 and 200.

First, the lower panel 100 will be described.

A plurality of gate conductors including a plurality of gate lines 121 and a plurality of storage electrode lines 131 are formed on an insulating substrate 110.

Each gate line 121 transmits gate signals, and includes a plurality of pairs of first and second gate electrodes 124a and 124b protruding upward therefrom.

The storage electrode lines 131 extend substantially in a transverse direction, and are supplied with a predetermined voltage such as a common voltage Vcom. Each storage electrode line 131 is disposed between two neighboring gate lines 121, and, in the present exemplary embodiment, is closer to the lower gate line 121. Each storage electrode line 131 includes a plurality of storage electrodes 137 protruding downward. However, alternative exemplary embodiments include configurations wherein the shape and arrangement of the storage electrode lines 131 may be variously changed.

A gate insulating layer 140, exemplary embodiments of which may be made of silicon nitride ("SiNx") or silicon oxide ("SiOx"), is formed on the gate conductors 121 and 131.

A plurality of pairs of first and second semiconductor islands 154a and 154b, exemplary embodiments of which may be made of hydrogenated amorphous silicon (a-Si) or polysilicon, are formed on the gate insulating layer 140. The first and second semiconductor islands 154a and 154b are respectively disposed on the first and second gate electrodes 124a and 124b.

A pair of ohmic contact islands 163a and 165a is formed on each first semiconductor island 154a, and a pair of ohmic contact islands (not shown) is formed on each second semiconductor island 154b. Exemplary embodiments of the ohmic contact islands 163a and 165a may be made of a material such as n+ hydrogenated amorphous silicon in which an n-type impurity such as phosphorus is doped with a high concentration, or of silicide.

A plurality of pairs of first and second data lines 171a and 171b and a plurality of first and second drain electrodes 175a and 175b are formed on the ohmic contacts 163a and 165a, and the gate insulating layer 140. The first and second data lines 171a and 171b transmit data signals, and extend substantially in the longitudinal direction thereby being disposed substantially perpendicular to the gate lines 121 and the storage electrode lines 131. The first and second data lines 171a and 171b include a plurality of pairs of first and second source electrodes 173a and 173b, exemplary embodiments of which may be bent in a C shape or in a transversely turned C shape toward the first and second gate electrodes 124a and 124b.

In the present exemplary embodiment, the first/second drain electrode 175a/175b includes a bar-shaped end portion and a first/second extension 177a/177b having a wide area. The bar-shaped end portion of the first/second drain electrode 175a/175b is disposed opposite to the first/second source electrode 173a/173b with respect to the first/second gate electrode 124a/124b, and is enclosed by the curved first/second source electrode 173a/173b. The first extension 177a is overlapped with a left half of the storage extension part 137, and the second extension 177b is overlapped with a right half of the storage extension part 137. However, alternative exemplary embodiments include different configurations for the first/second source electrodes 173a/173b and the first/second drain electrode 175a/175b, e.g., in one exemplary embodiment the source and drain electrodes may include interdigitated comb-shaped electrodes.

The first/second gate electrode 124a/124b, the first/second source electrode 173a/173b, and the first/second drain electrode 175a/175b respectively constitute the first/second thin film transistor Qa/Qb together with the first/second semiconductor 154a/154b. The channels of the first/second thin film transistor Qa/Qb is formed in the first/second semiconductor 154a/154b between the first/second source electrode 173a/173b and the first/second drain electrode 175a/175b.

In the present exemplary embodiment, the ohmic contacts 163a and 165a (and those not shown) are formed only between the underlying semiconductors 154a (and 154b) and the overlying data conductors 171a and 175a (and 171b and 175b), and reduce the contact resistance therebetween. The first and second semiconductors 154a and 154b have a portion that is exposed without being covered by the data conductors 171a, 171b, 175a, and 175b, and a portion between the first and second source electrodes 173a and 173b and the first and second drain electrodes 175a and 175b as shown in FIGS. 6 and 7.

A passivation layer 180 is formed on the data conductors 171a, 171b, 175a, and 175b, and the exposed semiconductors 154a and 154b. The passivation layer 180 includes a plurality of contact holes 185a and 185b exposing the first and second extensions 177a and 177b.

A plurality of pixel electrodes 191 including a plurality of pairs of first and second subpixel electrodes 191a and 191b, exemplary embodiments of which may be made of a transparent conductive material exemplary embodiments of which include indium tin oxide ("ITO") and indium zinc oxide ("IZO"), or a reflective material, exemplary embodiments of which include metals such as aluminum, silver, chromium, and alloys thereof, are formed on the passivation layer 180.

In the present exemplary embodiment, the overall planar outline of one pixel electrode 191 is a rectangle, and the first and second subpixel electrodes 191a and 191b are separated from each other with a gap disposed therebetween. In one exemplary embodiment, the first and second subpixel electrodes 191a and 191b may be engaged, or interlaced, with one another as described in more detail below. The first and second subpixel electrodes 191a and 191b have a substantially symmetrical form with reference to a virtual horizontal center line CL.

In the present exemplary embodiment, the first subpixel electrode 191a includes a lower projection portion, a left longitudinal stem portion, a horizontal stem portion extending to the right from a center of the longitudinal stem portion, and a plurality of branch portions. A branch portion positioned above the horizontal center line CL extends obliquely in an upper right direction from the longitudinal stem portion or the horizontal stem portion. The other branch portion positioned below the horizontal center line CL extends obliquely in a lower right direction from the longitudinal stem portion or the horizontal stem portion. In one exemplary embodiment, an angle formed by the branch portions with the gate line 121 or the horizontal center line CL may be approximately 45 degrees.

In the present exemplary embodiment, the second pixel electrode 191b includes the lower projection portion, a right longitudinal stem portion, upper and lower horizontal stem portions, and a plurality of branch portions. The upper and lower horizontal stem portions extend horizontally to the left from a lower end and an upper end of the longitudinal stem portion, respectively. A branch portion positioned above the horizontal center line CL extends obliquely in a lower left direction from the longitudinal stem portion or the upper horizontal stem portion. The other branch portion positioned below the horizontal center line CL extends obliquely in an upper left direction from the longitudinal stem portion or the lower horizontal stem portion. An angle formed by the branch portions of the second pixel electrode 191b with the gate line 121 or the horizontal center line CL may also be approximately 45 degrees, similar to the first subpixel electrode 191a. The upper and lower branch portions may be disposed at substantially right angles to each other around the horizontal center line CL.

The branch portions of the first and second subpixel electrodes 191a and 191b are engaged with each other and are alternately disposed, thereby forming a pectinated pattern. In one exemplary embodiment, a low gray region LA where the interval between neighboring branch portions is narrow and a high gray region (the remaining region except for the low gray region LA) where the interval between neighboring branch portions is relatively far exist, and the low gray region LA is divided on the upper and lower sides with respect to the high gray region. The interval between branch portions of the first and second subpixel electrodes 191a and 191b and the width of the branch portions may be variously changed in the low gray region LA and the high gray region. Alternative exemplary embodiments include configurations wherein only a high or low gray region is formed.

Accordingly, it is possible to make the inclination angle of the liquid crystal molecules various and to display different luminances from one image information by varying the intervals between the first and second subpixel electrodes 191a and 191b of one pixel. Further, it is possible to make an image viewed from a side similar to an image viewed from a front by properly adjusting the intervals between the branch portions of the first and second subpixel electrodes 191a and 191b. Therefore, it is possible to improve lateral visibility and to enhance transmittance.

The first and second subpixel electrodes 191a and 191b are physically and electrically connected to the first and second drain electrodes 175a and 175b through the contact holes 185a and 185b. The first and second subpixel electrodes 191a and 191b receive the data voltage from the first and second drain electrodes 175a and 175b. The first and second subpixel electrodes 191a and 191b constitute the liquid crystal capacitor Clc together with the liquid crystal layer 3. The first and second subpixel electrodes 191a and 191b maintain the applied voltage even after the first and second thin film transistors Qa and Qb are turned off due to the voltage stored in the liquid crystal capacitor Clc and the voltage stored in the first and second storage capacitors Csta and Cstb, when present.

The first and second extension parts 177a and 177b of the first and second drain electrode 175a and 175b connected to the first and second subpixel electrodes 191a and 191b are overlapped with the storage extension part 137 with the gate insulating layer 140 interposed therebetween, thereby constituting the first and second storage capacitors Csta and Cstb. The first and second storage capacitors Csta and Cstb enhance the voltage storage capacity of the liquid crystal capacitor Clc as has been previously described.

Next, the upper panel 200 will be described.

A light blocking member 220 is formed on an insulation substrate 210. The light blocking member 220 prevents light leakage between the pixel electrodes 191 and includes an opening region therein facing the pixel electrodes 191.

A plurality of colors filter 230 is formed on the insulation substrate 210 and the light blocking member 220. A majority of an individual color filter 230 exists within a region surrounded by the light blocking member 220. In one exemplary embodiment, the color filters 230 may be elongated along a row of the pixel electrodes 191, e.g., each pixel of a particular row may share a common color filter. Each of the color filters 230 may display one of primary colors including three primary colors such as red, green, and blue as discussed above.

An overcoat 250 is formed on the color filters 230 and the light blocking member 220. In one exemplary embodiment, the overcoat 250 may be made of an organic, or inorganic, insulator. The overcoat 250 prevents the color filters 230 from being exposed and provides a flat surface, e.g., it planarizes the underlying layers. Exemplary embodiments include configurations wherein the overcoat 250 may be omitted.

A plurality of short protrusions 320 is formed on the overcoat 250. In one exemplary embodiment, each short protrusion 320 simultaneously faces the first and second subpixel electrodes 191a and 191b, and is disposed in a region where light is not transmitted, such as the region where the first and second drain electrodes 175a and 175b or the storage electrodes 137 are disposed, as shown in FIG. 5, and thereby reduction of the aperture ratio and the transmittance of the display may be prevented. Exemplary embodiments include configurations wherein the short protrusion 320 may be made of an organic material, exemplary embodiments of which include resin, and the height of the short protrusion 320 is smaller than the cell gap of the liquid crystal layer 3.

Referring to FIG. 6, a short electrode 330 is further formed on the short protrusion 320, The short electrode 330 may be formed by depositing a conductive material, exemplary embodiments of which include ITO or IZO, and patterning it by photolithography. Exemplary embodiments include configurations wherein the short electrode 330 may cover the overcoat 250 as well as the short protrusion 320 (not shown). Alternative exemplary embodiments include configurations wherein the short electrode 330 is omitted, e.g., as in the exemplary embodiment illustrated in FIG. 7. In one such alternative exemplary embodiment the short protrusion 320 may be made of a conductive polymer.

Alignment layers 11 and 21 are formed on inner surfaces of the lower and upper panels 100 and 200, and they may be vertical alignment layers.

A polarizer (not shown) may be provided on outer surfaces of the panels 100 and 200.

In the present exemplary embodiment, the liquid crystal layer 3 interposed between the lower panel 100 and the upper panel 200 has positive dielectric anisotropy. The liquid crystal molecules 31 may have their long axes aligned to be substantially vertical to the surfaces of two panels 100 and 200 in the absence of an electric field.

When data voltages having different polarities are applied to the first and second subpixel electrodes 191a and 191b, a potential difference is generated between both terminals of the liquid crystal capacitor Clc, e.g., the first and second pixel electrodes, such that the liquid crystal molecules 31 are inclined substantially parallel to the direction of the electric field, as illustrated in FIG. 4. However, the liquid crystal molecules 32 spaced at the same distance from the first and second subpixel electrodes 191a and 191b may not be tilted to either side and maintain their initial vertical orientation.

Here, if a pressure from the outside is applied to the display panels 100 and 200, the cell gap of the liquid crystal layer 3 of the pressed portion is decreased, and the short electrode 330 (in FIG. 6), or the short protrusion 320 (in FIG. 7) of the upper panel 200, contacts the first and second subpixel electrodes 191a and 191b of the lower panel 100 with the alignment layers 11 and 21 interposed therebetween. Thus, leakage current flows between the first and second subpixel electrodes 191a and 191b such that the voltage difference between the first and second subpixel electrodes 191a and 191b almost vanishes and the pressed pixel PX displays substantially black. Accordingly, although liquid crystal molecules 32 at the region A spaced at the same distance from the first and second subpixel electrodes 191a and 191b are tilted horizontal to the display panels 100 and 200 by the externally supplied pressure, the electric field that was applied to the liquid crystal layer 3 almost vanishes. Thus, the original vertical alignment state may be recovered again when the pressure from the outside is removed. That is, display deterioration such as yellowish bruising is not generated, wherein the yellowish bruising is generated when the liquid crystal molecules 32 arranged substantially horizontal to the display panels 100 and 200 by pressure are influenced by the strong electric field in the liquid crystal layer 3 so that the liquid crystal molecules 32 maintain the horizontal state even after the removal of the pressure.

Also, the pixels PX around the pressed region are also pressed such that the short electrode 330 (in FIG. 6) or the short protrusion 320 (in FIG. 7) of the upper panel 200 gets closer to the first and second subpixel electrodes 191a and 191b of the lower panel 100 via the alignment layers 11 and 21. Thus, the capacitance of the capacitor formed by the short electrode 330 or the short protrusion 320 with the first and second subpixel electrodes 191a and 191b is increased, and the voltage difference between the first and second subpixel electrodes 191a and 191b is decreased. Accordingly, the corresponding pixels PX display an image of a low gray. Therefore, even though the liquid crystal molecules 32 around the region A spaced at the same distance from the first and second subpixel electrodes 191a and 191b were pressed by an exterior pressure, the liquid crystal molecules 32 may restore their initial vertical alignment state substantially instantaneously when the pressure is removed.

After the pixels that were pressed by an exterior pressure displayed a black or low gray image, the pixels again receive data voltages corresponding to an image to be displayed through the first and the second data lines 171a and 171b.

In this way, by forming short protrusions 320 in the upper panel 200, deterioration such as a stain generated by a pressure may be removed without the need of changing the driving method or decrease of luminance. When no pressure is applied, the short protrusion 320 or the short electrode 330 forms a capacitor along with the first and second subpixel electrodes 191a and 191b of the lower panel 100. The capacitor may have a function to assist the first and second storage capacitors Csta and Cstb. Thereby, the short protrusions 320 may allow for quickly and easily removing image deterioration from the resultant display.

Next, an exemplary embodiment of an LCD according to the present invention will be described with reference to FIG. 9 to FIG. 12.

Figure 9:
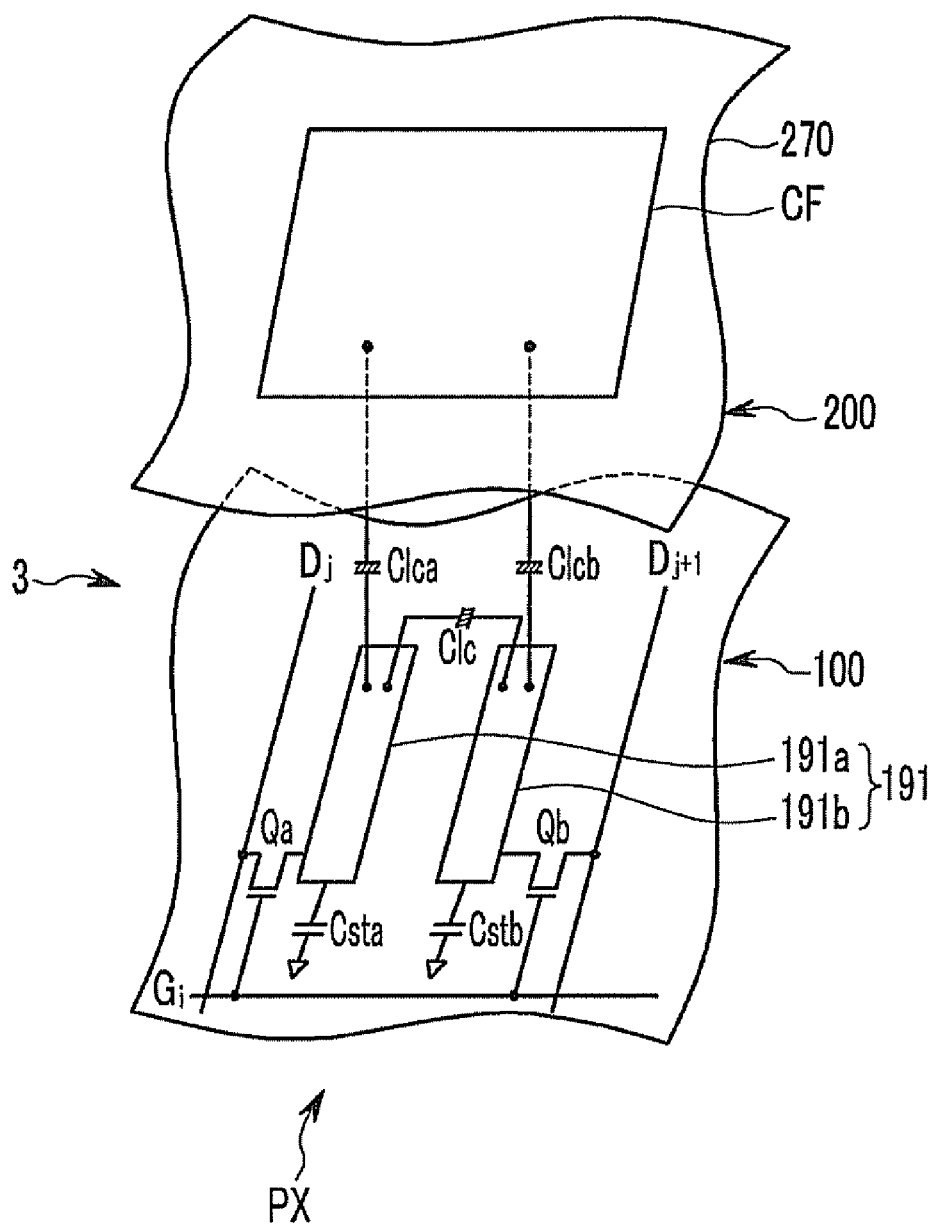
FIG. 9 is an equivalent circuit diagram of one pixel of an exemplary embodiment of an LCD having an exemplary embodiment of a structure according to the present invention.
Figure 10:
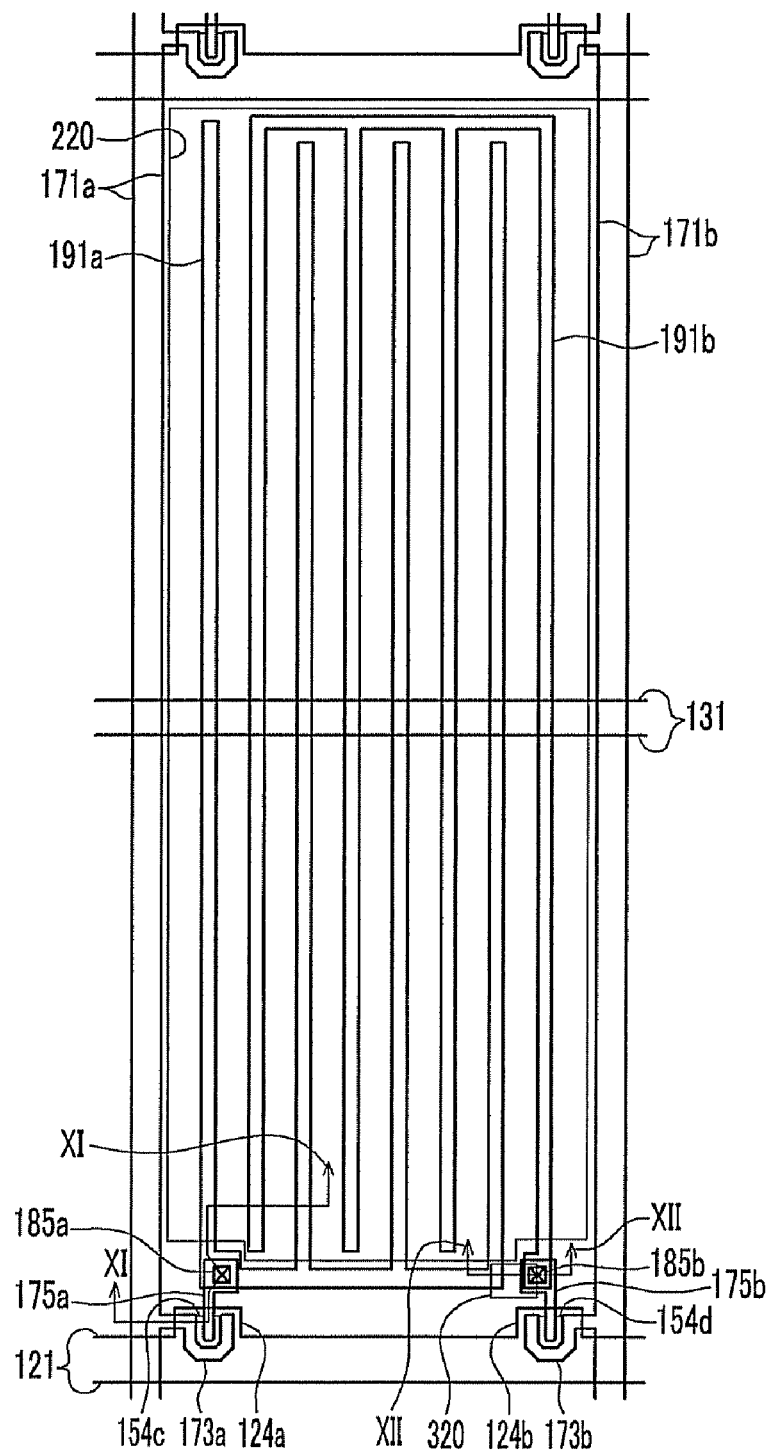
FIG. 10 is a top plan layout view of an exemplary embodiment of an LCD according to the present invention.
Figure 11:
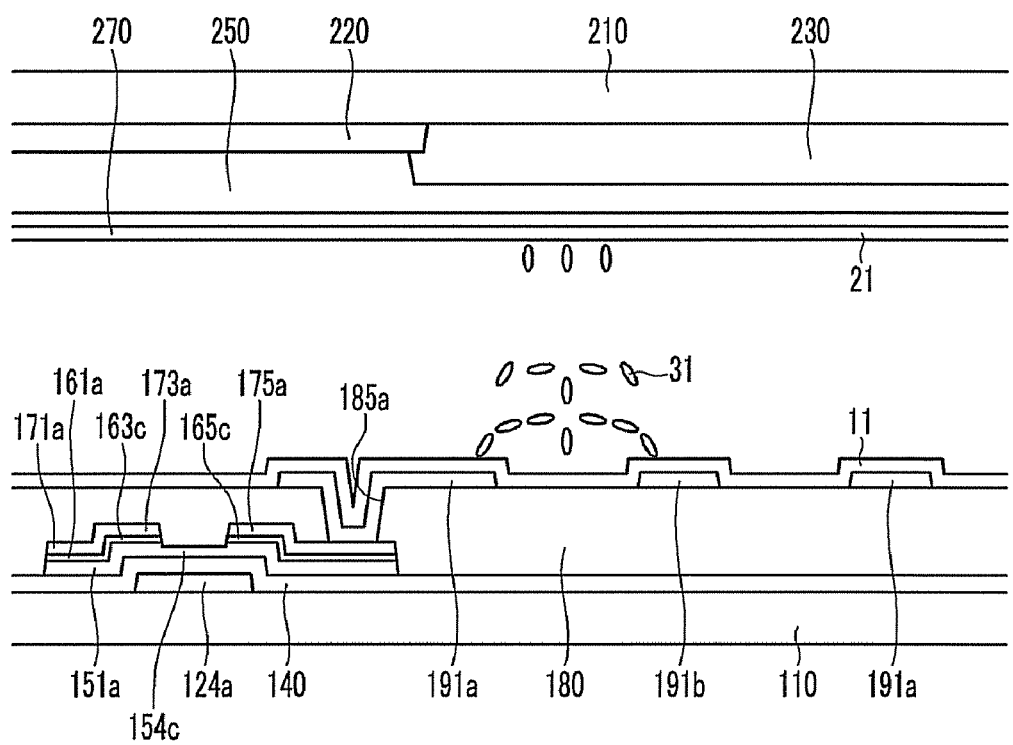
FIG. 11 and FIG. 12 are cross-sectional views of the exemplary embodiment of an LCD illustrated in FIG. 10 taken along lines XI-XI and XII-XII, respectively.
Figure 12:
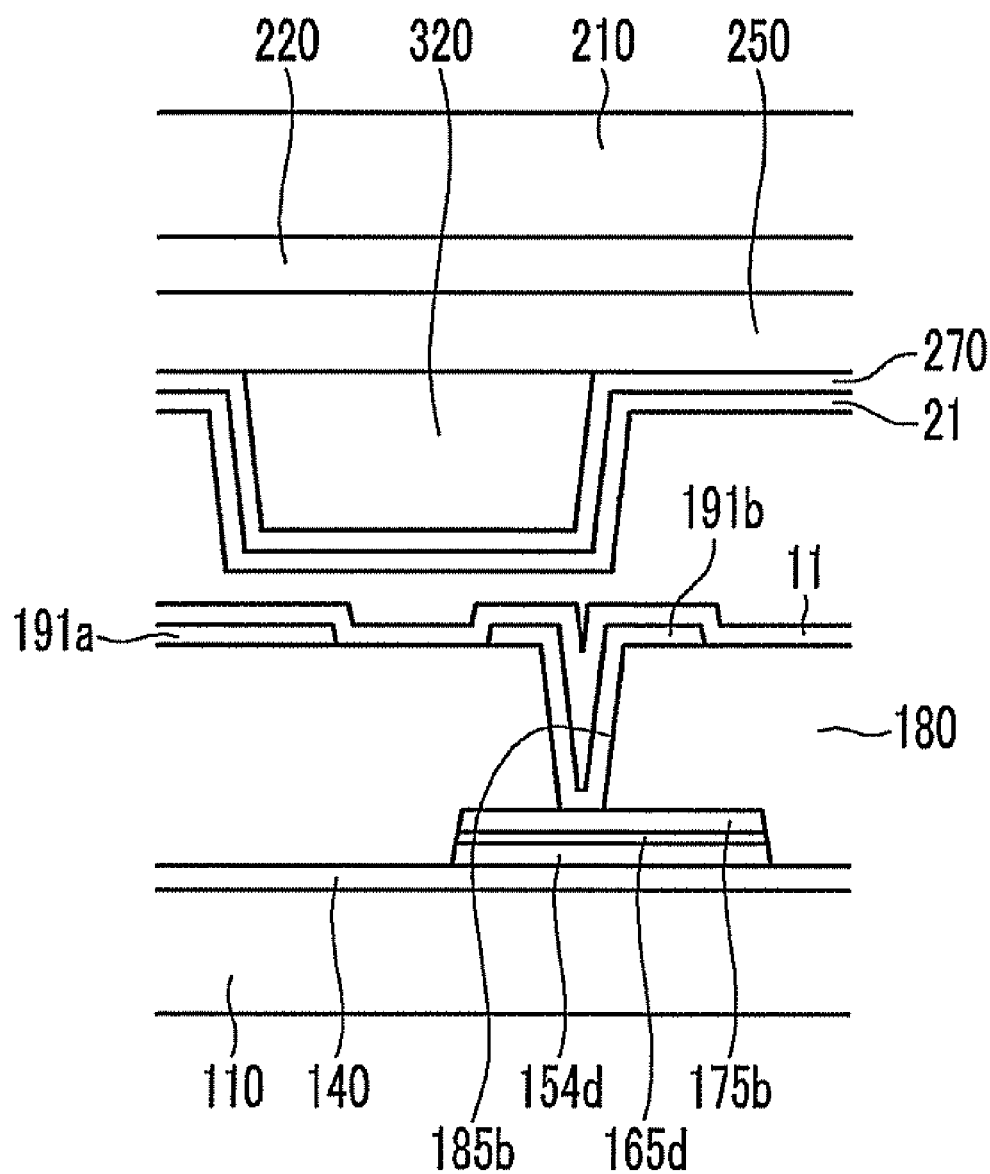

FIG. 9 is an equivalent circuit diagram of one pixel of an exemplary embodiment of an LCD having an exemplary embodiment of a structure according to the present invention, FIG. 10 is a top plan layout view of an exemplary embodiment of an LCD according to the present invention, and FIG. 11 and FIG. 12 are cross-sectional views of the exemplary embodiment of an LCD illustrated in FIG. 10 taken along lines XI-XI and XII-XII, respectively.

Referring to FIG. 9, the present exemplary embodiment of an LCD also includes signal lines including a plurality of gate lines $G_i$ and plurality of pairs of data lines $D_j$ and $D_{j+1}$, and a plurality of pixels PX connected thereto, similar to the exemplary embodiment of FIG. 2.

Each pixel PX includes first and second switching elements Qa and Qb that are connected to the signal lines $G_i$, $D_j$, and $D_{j+1}$, a liquid crystal capacitor Clc, and the first and second storage capacitors Csta and Cstb.

However, unlike the previous exemplary embodiment shown in FIG. 2, in the present exemplary embodiment, a common electrode 270 is formed on substantially the whole surface of an upper panel 200. The first and second liquid crystal capacitors Clca and Clcb include the first and second subpixel electrodes 191a and 191b of a lower panel 100 and the common electrode 270 of the upper panel 200 as two terminals, respectively, and the liquid crystal capacitor Clc includes the first and second subpixel electrodes 191a and 191b of the lower panel 100 as the two terminals.

In the present exemplary embodiment, an electric field parallel to the panels 100 and 200 is generated in a liquid crystal layer 3 between the first and second subpixel electrodes 191a and 191b that are applied with data voltages having different polarities. At the same time, an electric field is generated in the liquid crystal layer 3 between the first and second subpixel electrodes 191a and 191b of the lower panel and the common electrode 270 of the upper panel 200. Edges of the first and second subpixel electrodes 191a and 191b distort the electric field together with the common electrode 270, thereby generating a horizontal component that is substantially perpendicular to the edges of the subpixel electrodes 191a and 191b. Therefore, liquid crystal molecules of the liquid crystal layer 3 having positive dielectric anisotropy are aligned to be substantially parallel to the electric field, and a variation degree of polarization of light incident in the liquid crystal layer 3 is varied depending on an inclination degree of the liquid crystal molecules.

Next, one exemplary embodiment of the liquid crystal display shown in FIG. 9 will be described with reference to FIG. 10 to FIG. 12.

A layered structured of the current exemplary embodiment of a liquid crystal panel assembly is substantially the same as that of the previous exemplary embodiments of a liquid crystal panel assembly shown in FIG. 5 to FIG. 7.

First, referring to the lower panel 100, a plurality of gate lines 121 including a plurality of pairs of first and second gate electrodes 124a and 124b, a plurality of storage electrode lines 131, a gate insulating layer 140, a plurality of pairs of first and second semiconductor stripes 151a and 151b, a plurality of pairs of first and second ohmic contact stripes 161a, a plurality of pairs of first and second ohmic contact islands 165c, a plurality of pairs of first and second data lines 171a and 171b, a plurality of pairs of first and second drain electrodes 175a and 175b, a passivation layer 180, first and second subpixel electrodes 191a and 191b, and an alignment layer 11 are sequentially formed on an insulating substrate 110.

Next, referring to the upper panel 200, a light blocking member 220, a color filter 230, an overcoat 250, a short protrusion 320, a common electrode 270, and an alignment layer 21 are sequentially formed on an insulation substrate 210.

Unlike the exemplary embodiment of a liquid crystal panel assembly shown in FIG. 5 to FIG. 7, in the present exemplary embodiment, the first and second semiconductors 151a and 151b are linear and include first and second protrusions 154c and 154d protruding along source electrodes 173a and 173b and drain electrodes 175a and 175b. Further, the ohmic contacts 161a also linearly extend along the data lines 171a and 171b and include protrusions 163a protruding along the source electrodes 173a and 173b.

The storage electrode lines 131 are positioned between two adjacent gate lines 121 and are spaced from the two gate lines 121 by substantially the same distance. The first and second subpixel electrodes 191a and 191b overlap with the storage electrode lines 131 with the gate line insulating layer 140 and the passivation layer 180 interposed therebetween, thereby forming first and second storage capacitors Csta and Cstb.

In the present exemplary embodiment, each of the first and second subpixel electrodes 191a and 191b has a longitudinal portion and a plurality of transverse portions. The transverse portion of the first subpixel electrode 191a is positioned at a lower end of the pixel and the longitudinal portions of the first subpixel electrode 191a extend upward from the transverse portion. The transverse portion of the second pixel electrode 191b is positioned at an upper end of the pixel and the plurality of longitudinal portions of the second pixel electrode 191b extend downward from the transverse portion. The transverse portions and the longitudinal portions of the first and second subpixel electrodes 191a and 191b are substantially perpendicular to each other. The longitudinal portions of the first and second subpixel electrodes 191a and 191b are alternately arranged. Alternative exemplary embodiments include configurations wherein the transverse and longitudinal arrangement of the subpixel electrodes 191a and 191b may be variously modified.

Each short protrusion 320 faces both the first and second subpixel electrodes 191a and 191b and is disposed in a region where the light blocking member 220 is disposed, thereby preventing a decrease of the aperture ratio and the transmittance as well as covering, and thereby preventing the viewing of, textures where the arrangement of the liquid crystal molecules 31 is not controlled around the short protrusion 320.

In the present exemplary embodiment, if a pressure from the outside is applied to the display panels 100 and 200, the common electrode 270 on the short protrusion 320 of the upper panel 200 contacts the first and second subpixel electrodes 191a and 191b of the lower panel 100 with the alignment layers 11 and 21 therebetween. Then, leakage current flows between the common electrode 270 and the first and second subpixel electrodes 191a and 191b such that the voltage difference between the common electrode 270 and the first and second subpixel electrodes 191a and 191b is eliminated, and the pushed pixel PX displays a nearly black display. Accordingly, although the liquid crystal molecules 32 that were initially vertically aligned happen to be pressed horizontal to the display panels 100 and 200 by an exterior pressure, the electric field applied to the liquid crystal layer 3 is almost eliminated such that the initial vertical alignment state may again be restored shortly after the external pressure is removed. This may allow a display deterioration to be quickly and easily removed as discussed in detail above.

Various characteristics of the liquid crystal display shown in FIG. 5 to FIG. 7 may also be applied to the present exemplary embodiment.

Next, referring to FIG. 13 and FIG. 14, another exemplary embodiment of an LCD according to the present invention will be described.

Figure 13:
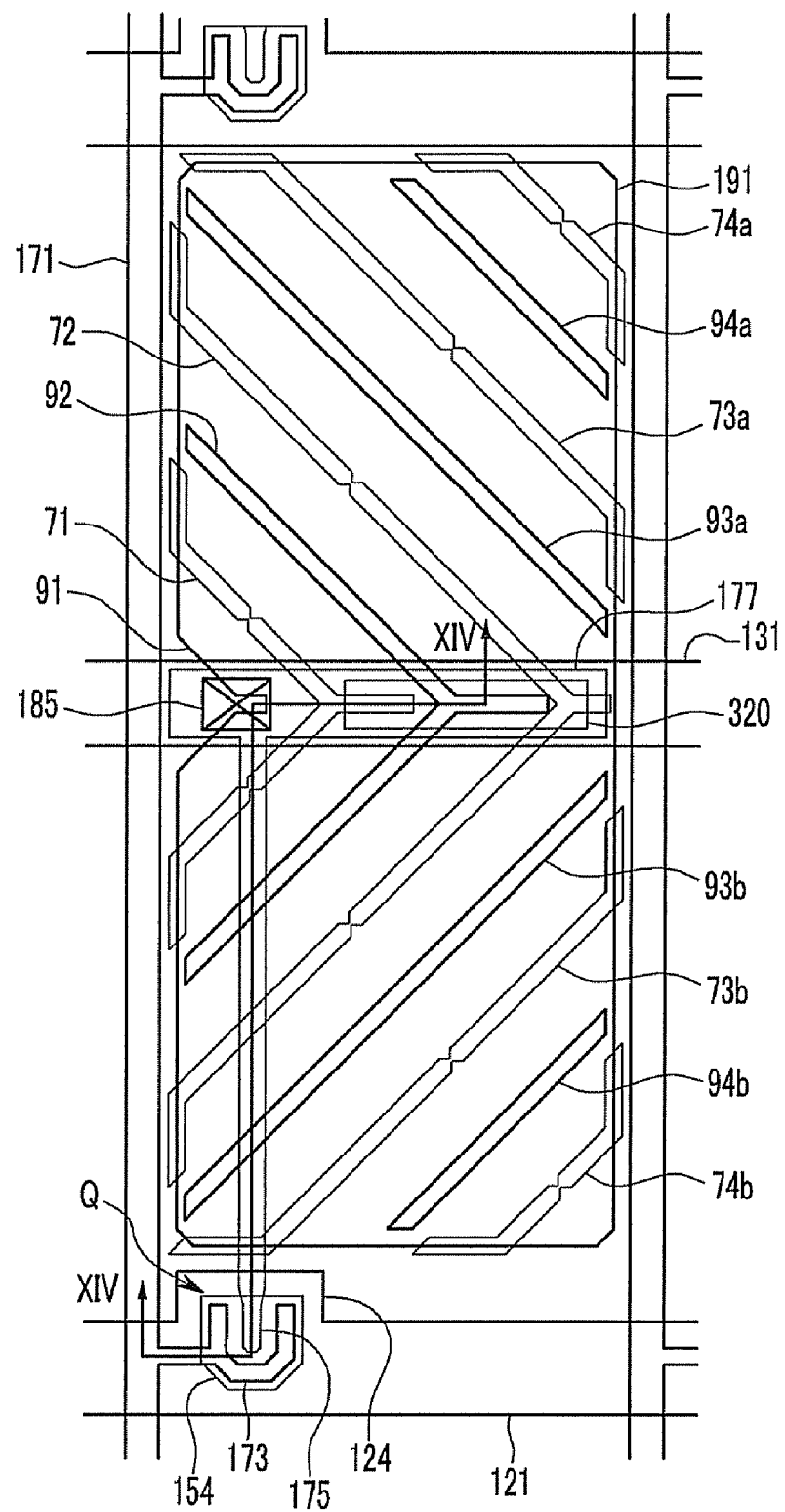
FIG. 13 is a top plan layout view of an exemplary embodiment of an LCD according to the present invention.
Figure 14:
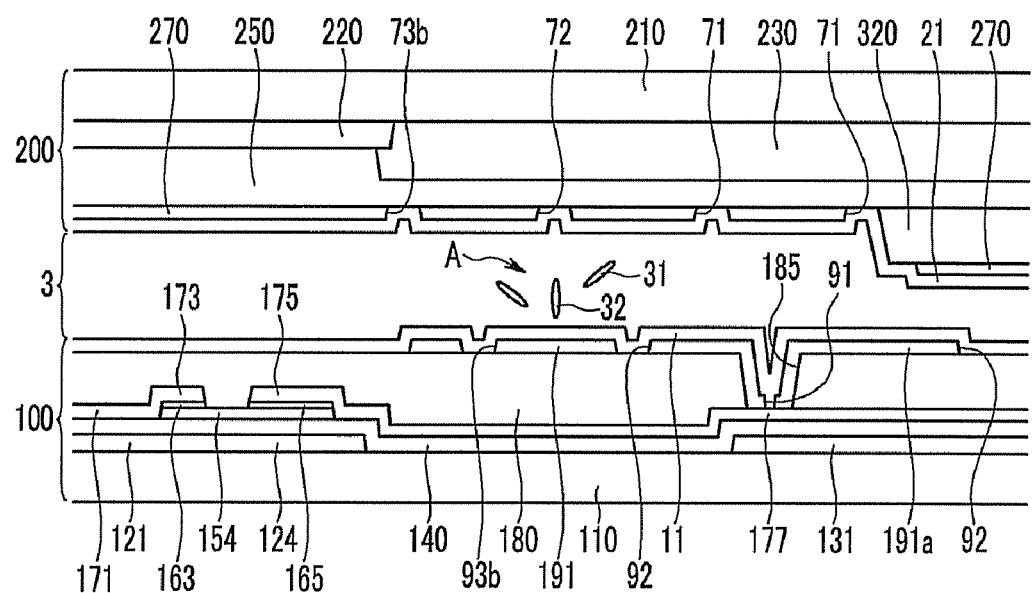
FIG. 14 is a cross-sectional view of an exemplary embodiment of an LCD illustrated in FIG. 13 taken along line XIV-XIV.

FIG. 13 is a top plan layout view of an exemplary embodiment of an LCD according to the present invention, and FIG. 14 is a cross-sectional view of the exemplary embodiment of an LCD shown in FIG. 13 taken along line XIV-XIV.

A layered structured of the present exemplary embodiment of a liquid crystal panel assembly is also substantially the same as that of the previous exemplary embodiment of a liquid crystal panel assembly shown in FIG. 5 to FIG. 7.

First, referring to the lower panel 100, a gate line 121 including a plurality of gate electrodes 124 and a plurality of storage electrode lines 131, a gate insulating layer 140, a plurality of semiconductor islands 154, a plurality of pairs of ohmic contact islands 163 and 165, a plurality of data lines 171, a plurality of drain electrodes 175, a passivation layer 180 having a plurality of contact holes 185, a plurality of pixel electrodes 191, and an alignment layer 11 are sequentially formed on an insulation substrate 110.

Referring to the upper panel 200, a light blocking member 220, a color filter 230, an overcoat 250, a short protrusion 320, a common electrode 270, and an alignment layer 21 are formed on an insulation substrate 210.

In the present exemplary embodiment, each pixel electrode 191 has an approximately quadrangle shape having four main edges disposed nearly parallel to the gate lines 121 or the data lines 171, as well as four chamfered corners. Each pixel electrode 191 includes a first central cutout 91, a second central cutout 92, a first upper cutout 93a, a first lower cutout 93b, a second upper cutout 94a, and a second lower cutout 94b, and is divided into a plurality of partitions by the cutouts 91-94b.

In the present exemplary embodiment, the common electrode 270 has a plurality of sets of cutouts 71, 72, 73a, 73b, 74a, and 74b. The cutouts 71-74b include first and second central cutouts 71 and 72, first and second upper cutouts 73a and 74a, and first and second lower cutouts 73b and 74b. Also in the present exemplary embodiment, each of the cutouts 71-74b has at least one oblique portion substantially extending obliquely to the gate lines Gi, and each oblique portion has a plurality of notches that are concave or convex.

Alternative exemplary embodiments include configurations wherein at least one of the cutouts 91-94b and 71-74b of the pixel electrodes 191 and the common electrode 270 may be replaced with protrusions or depressions, and the shape and arrangement thereof may be changed.

The liquid crystal layer 3 between the lower panel 100 and the upper panel 200 may have negative dielectric anisotropy, and may be initially oriented such that the major axes of the liquid crystal molecules of the liquid crystal layer 3 are substantially perpendicular to the surfaces of the two display panels 100 and 200 when no electric field is applied.

The pixel electrode 191 and the common electrode 270 form a liquid crystal capacitor Clc along with the liquid crystal layer 3 therebetween to maintain the applied voltages after the thin film transistor Q, which includes the gate electrode 124, the semiconductor 154, the source electrode 173, and the drain electrode 175, is turned off.

A wide end portion 177 of the drain electrode 175 connected to the pixel electrode 191 overlaps the storage electrode line 131 via the gate insulating layer 140 to form the storage capacitor Cst to enhance the voltage storing capacity of the liquid crystal capacitor Clc.

The pixel electrodes 191 applied with the data voltage generate an electric field together with the common electrode 270 applied with the common voltage Vcom, thereby determining an orientation of liquid crystal molecules of the liquid crystal layer 3 between the two electrodes 191 and 270. This electric field includes a vertical component substantially perpendicular to the surface of the display panels 100 and 200, and a horizontal component substantially parallel to the surface of the display panels 100 and 200 and substantially perpendicular to the cutouts 91-94b and 71-74b. The inclined direction of the liquid crystal molecules is primarily determined depending on the horizontal component, and the tilt directions of the liquid crystal molecules are basically classified into four directions. When the tilt directions of the liquid crystal molecules are diversified in this way, the reference viewing angle of the liquid crystal display may be increased.

However, there exist liquid crystal molecules 32 that are disposed between liquid crystal molecules 31 that are inclined in the different directions, and are not inclined in any direction, thereby maintaining the initial vertical alignment state. If a pressure from the outside is applied to the display panels 100 and 200, the common electrode 270 on the short protrusion 320 of the upper panel 200 contacts the pixel electrode 191 of the lower panel 100 via the alignment layers 11 and 21. Thus, leakage current flows between the common electrode 270 and the pixel electrode 191 such that the voltage difference between the common electrode 270 and the pixel electrode 191 is eliminated, and thereby the pushed pixel PX displays nearly black. Accordingly, although liquid crystal molecules 32 that were initially vertically aligned are pressed horizontal to the display panels 100 and 200 by the exterior pressure, the electric field applied to the liquid crystal layer 3 is almost eliminated such that the initial vertical alignment state may be restored shortly after the external pressure is removed, thereby preventing stains.

In the present exemplary embodiment, the short protrusion 320 overlaps the storage electrode line 131 such that decrease of the aperture ratio and the transmittance may be prevented, and textures that are generated by the liquid crystal molecules 31 that are not controlled near the short protrusion 320 may be covered.

According to an exemplary embodiment of the present invention, a response speed of liquid crystal molecules may be improved, and a contrast ratio and a viewing angle may be increased. Also, good display characteristics may be obtained regardless of any influence such as a pressure from the outside of an LCD.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   first and second substrates facing each other;
   a liquid crystal layer interposed between the first and second substrates and including liquid crystal molecules;
   a first subpixel electrode disposed on the first substrate, the first subpixel electrode receiving a first data voltage;
   a second subpixel electrode disposed on the first substrate, the second subpixel electrode receiving a second data voltage; and
   a short protrusion disposed on the second substrate and simultaneously facing the first and second subpixel electrodes,
   wherein the liquid crystal layer is vertically aligned and has positive dielectric anisotropy, and
   the short protrusion is disposed in a region where light is not transmitted.

2. The liquid crystal display of claim 1, wherein the short protrusion comprises a conductive polymer.

3. The liquid crystal display of claim 1, further comprising:
   a short electrode disposed on the short protrusion.

4. The liquid crystal display of claim 3, wherein the short electrode comprises a conductive material.

5. The liquid crystal display of claim 4, wherein the conductive material includes at least one of indium tin oxide and indium zinc oxide.

6. The liquid crystal display of claim 1, wherein a height of the short protrusion is smaller than a cell gap of the liquid crystal layer.

7. The liquid crystal display of claim 1, further comprising:
   a light blocking member disposed on at least one of the first substrate and the second substrate,
   wherein the short protrusion overlaps the light blocking member.

8. The liquid crystal display of claim 1, further comprising:
   a gate line disposed on the first substrate and which transmits a gate signal;
   a first data line disposed on the first substrate, the first data line transmitting the first data voltage;
   a second data line disposed on the first substrate, the second data line transmitting the second data voltage;
   a first switching element connected to the gate line and the first data line, the first switching element comprising a first drain electrode connected to the first subpixel electrode; and
   a second switching element connected to the gate line and the second data line, the second switching element comprising a second drain electrode connected to the second subpixel electrode.

9. The liquid crystal display of claim 8, wherein the short protrusion overlaps at least one of the first and second drain electrodes.

10. The liquid crystal display of claim 8, further comprising:
    a storage electrode line disposed on the first substrate and comprising a portion overlapping at least one of the first and second drain electrodes,
    wherein the short protrusion overlaps the storage electrode line.

11. The liquid crystal display of claim 1, wherein
    each of the first and second subpixel electrodes comprises a plurality of branch electrodes, and
    wherein the branch electrodes of the first subpixel electrode and the branch electrodes of the second subpixel electrode are alternately disposed.

12. The liquid crystal display of claim 1, wherein the first and second data voltages have different polarities and substantially a same magnitude with respect to a common voltage.

13. The liquid crystal display of claim 1, further comprising:
    a common electrode which is disposed on the short protrusion and applied with a common voltage.

* * * * *